United States Patent [19]

Cardenas

[11] Patent Number: 4,737,222

[45] Date of Patent: Apr. 12, 1988

[54] APPARATUS FOR BUILDING TIRES

[75] Inventor: Armando Cardenas, Cuyahoga Falls, Ohio

[73] Assignee: The Uniroyal Goodrich Tire Company, Akron, Ohio

[21] Appl. No.: 754,386

[22] Filed: Jul. 12, 1985

[51] Int. Cl.$^4$ .............................................. B29D 30/24
[52] U.S. Cl. ................................... 156/415; 152/416
[58] Field of Search ............... 156/416, 398, 415, 417, 156/419, 128.1, 289, 414

[56] References Cited

U.S. PATENT DOCUMENTS

| 3,483,062 | 12/1969 | Madge | 156/401 |
| 3,923,572 | 12/1975 | Garver | 156/416 |
| 4,534,812 | 8/1985 | Fukui et al. | 156/416 X |

FOREIGN PATENT DOCUMENTS

| 1263287 | 3/1968 | Fed. Rep. of Germany | 156/416 |
| 1264758 | 3/1968 | Fed. Rep. of Germany | 156/416 |
| 1285725 | 12/1968 | Fed. Rep. of Germany | 156/416 |
| 2317655 | 10/1974 | Fed. Rep. of Germany | 156/416 |
| 44-19148 | 8/1969 | Japan | 156/416 |
| 51-03755 | 5/1976 | Japan | 156/416 |

Primary Examiner—Donald E. Czaja
Assistant Examiner—Ramon R. Hoch
Attorney, Agent, or Firm—Philip P. McCann; Harry F. Pepper, Jr.

[57] ABSTRACT

A tire building machine including flanges which have a surface to allow for the positioning and disengagement of a tire. The positioning and disengagement of the tire on the machine is effected by the surface interaction between the bead portions of the tire and the surface area of the flange. The surface area of the flange in the present invention includes a plurality of bead portion bearing surfaces to facilitate the release of the bead portions. In addition, the surface area of the flange is designed to reduce friction between the bead portions and the flange.

4 Claims, 2 Drawing Sheets

APPARATUS FOR BUILDING TIRES

BACKGROUND OF THE INVENTION

This invention relates to an apparatus for building pneumatic tires and more particularly to such apparatus which includes a pair of flanges suitable for positioning a partially built first stage "green" or uncured tire for shaping by the apparatus.

A tire building apparatus as described, for example, in U.S. Pat. No. 3,923,572, comprises a center shaft and an elongated sleeve on the center shaft, a pair of axial movable bead carrier flanges situated diametrically about a transverse plane which is normal to the center shaft and a screw means which positively drives or moves each flange axially about the transverse plane. Each flange includes a bead seat. One flange contains an inflation port for access to the interior of an air chamber formed when a tire carcass is mounted on the flanges.

When building a tire on such a tire building apparatus, the flanges are axially set about midway toward the transverse plane. The first stage green tire consisting of a carcass, a pair of bead portions, and a pair of sidewalls is placed on the apparatus such that each bead portion is positioned in a corresponding bead seat on each flange. Thereafter, the flanges are actuated to move each flange axially outwardly from the transverse plane to lock and support each bead portion in the corresponding bead seat. As each flange moves axially outwardly, the surface of each bead portion of the tire slides on the surface of the bead seat allowing proper positioning of the bead portion in the bead seat.

When the bead portions are suitably supported in corresponding bead seats, the axial outward movement of each flange is stopped. The air chamber is filled with air to inflate the first stage green tire during which the flanges are actuated to move axially inwardly towards the transverse plane allowing for shaping of the tire carcass to substantially its final diameter. When the first stage green tire is suitably shaped, an inextensible belt assembly and tread can be applied to the first stage green tire thereby forming a completely built second stage green tire.

After completion of building the green tire (e.g., by placing the belt assembly and tread around the expanded carcass), the air chamber is deflated, the bead portions are separated from the bead seats, the flanges are moved axially inwardly and the second stage green tire is removed from the tire building apparatus.

It has been found when mounting each bead portion on the corresponding flange, the bead portion does not easily slide on the surface leading to the bead seat and each bead portion generally adheres or sticks to the bead seat wherein the bead portion and the bead seat do not separate when the flanges are moved axially inwardly.

It is believed that the reason for such sliding difficulty is due to the interaction between the surface of the bead seat and the outer surface of each bead portion which includes a rubber coated finishing strip. Generally, such finishing strips are made of woven fabric which is coated on both sides with uncured rubber which is tacky and will stick to the bead seat when the green tire is being positioned on the flange. Furthermore, it is believed that the contact of the bead portion to the bead seat forms a pneumatic seal which prevents the release of the bead portion from the bead seat upon completion of the green tire.

Attempts to overcome the sliding difficulty and adhesion of the outer surface of the bead portion and the bead seat of the flange include periodical cleaning of the bead seat area with a lubricant such as castor oil. However, it has been found that such lubricants can be transferred to other areas of the tire wherein the lubricant is a contaminant. Also, application of such lubricants has resulted in a problem of buildup of polymerized castor oil in the bead registers of tire molds found in curing presses, resulting in additional maintenance.

SUMMARY OF THE INVENTION

It is an object of the present invention to make a tire building apparatus comprising a pair of axially movable flanges wherein each flange includes a bead seat and a mounting surface wherein the requirement of lubricant applied to the bead seat and the mounting surface is eliminated.

The tire building apparatus of the present invention comprises a transverse plane of symmetry normal to a central horizontal axis; a flange support assembly; a pair of axially spaced rim flanges mounted on the flange support assembly; drive means connected to said flanges whereby the drive means axially move the flanges about the transverse plane; each of said flanges containing a mounting surface which has a static coefficient of friction less than about 0.06 and each flange further includes an annular bead seat which has a selected radius of curvature and a plurality of bead portion bearing surfaces.

The tire building apparatus of the present invention has less contact area in the bead seat, reducing the amount of surface area available for a pneumatic seal to form between the bead portion and the bead seat. In addition, the mounting surface of each flange has a low coefficient of friction suitable for reducing resistance to mounting the bead portion in the bead seat and thereafter removing the bead portion from the flange.

Because the adhesion and resistance between the bead portion and the flange have been significantly reduced, the requirement of lubrication of the bead seat and mounting surface is eliminated. The elimination of lubricant reduces the possibilities of contaminant in the tire and eliminates the additional maintenance required to clean the buildup of polymerized castor oil in the bead registers of the tire mold.

DETAILED DESCRIPTION

Figure 1:
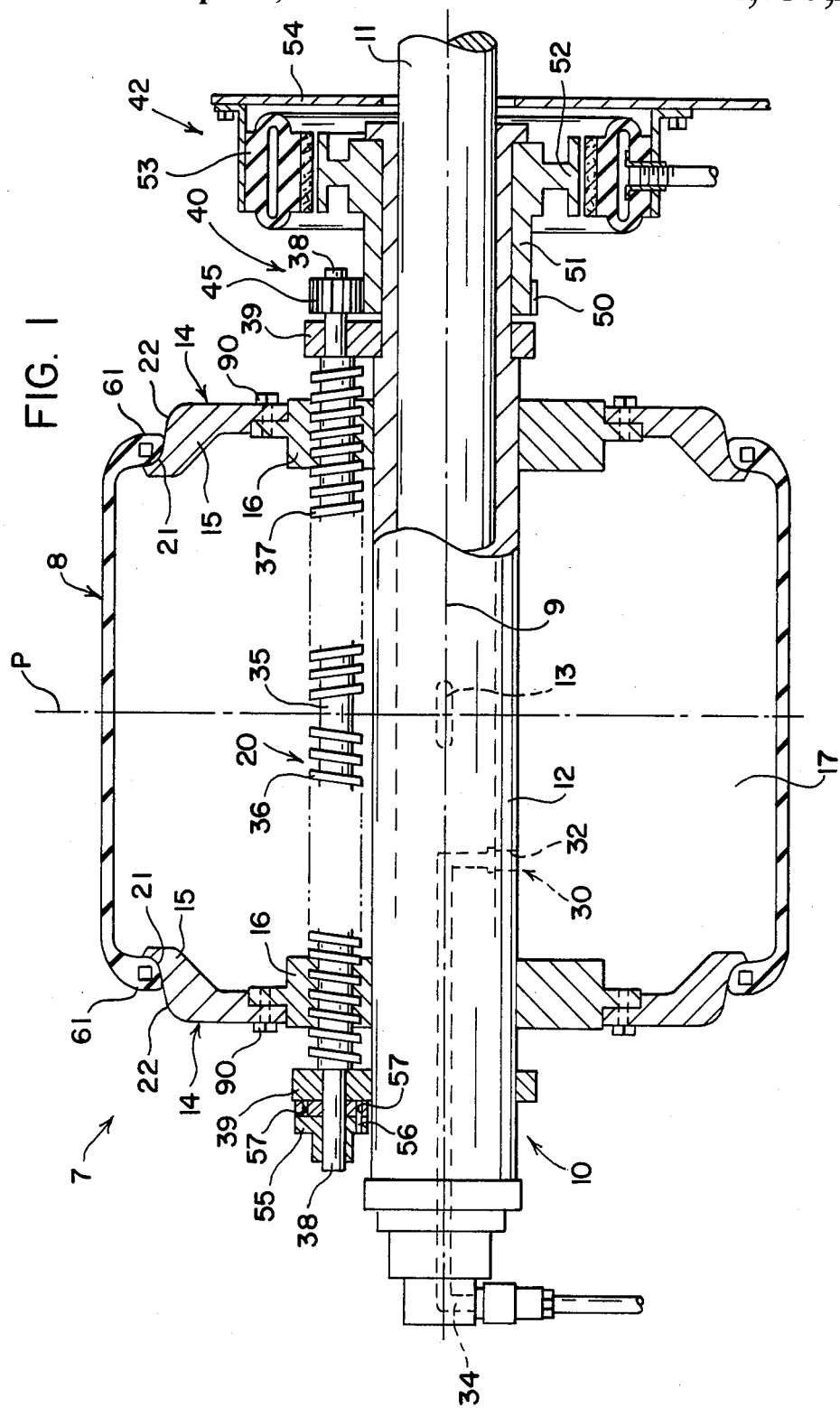
FIG. 1 is a longitudinal sectional view of a tire building apparatus with the flanges in partially retracted position with parts shown in section, broken away or omitted.

In FIG. 1 a tire building apparatus 7 according to the present invention is shown in a presently preferred embodiment with a partially built or first stage green tire 8 mounted on the tire building apparatus 7. The first stage green tire 8 includes a pair of bead portions 61.

The apparatus 7 comprises a pair of axial moveable flanges 14 shown in an outward axial position, a flange support assembly 10 and an axial drive means 20 to axially move each flange 14 on the flange support assembly 10. The pair of flanges 14 are radially concentric about a central horizontal axis 9 and axially symmetrical about a transverse center plane P normal to the central horizontal axis 9. The flange support assembly 10 is concentric about the horizontal axis 9. The axial drive means 20 connects the pair of flanges 14 and axially moves each flange 14 axially toward and axially away from the transverse center plane P.

Each flange 14 includes an upper flange portion 15 and at least one collar 16 which is secured to the upper flange portion 15 by a bolt 90 or other conventional means. In the present invention, three collars 16 are located about the radial inner periphery of each flange 14, wherein the collars are located at about 120° C. apart from each other. The collars 16 are slidably mounted on the sleeve 12 to allow for axial movement of each flange 14 with respect to the flange support assembly 10.

The flange support assembly 10 includes a rotatable central shaft 11 and an elongated sleeve 12 wherein the shaft 11 is mounted for controlled rotation about the horizontal axis 9 on a typical support frame [not shown]. Rotation of the shaft 11 can be supplied by conventional means well known in the art such as a motor drive mechanism.

The elongated sleeve 12 is attached to the central shaft 11 by a key 13 or other suitable means such that the sleeve 12 is concentrical about the horizontal axis 9 and rotatable with the central shaft 11.

An air inflation means 30 is formed in the flange support assembly 10 for access to the interior of an air chamber 17 formed by the first stage green tire 8, the pair of flanges 14, the collars 16 and the flange support system 10. The air inflation means 30 includes an air port 32 and conduit 34 connecting the port 32 to an air supply which is not shown. Supplying air to the air chamber 17 can be accomplished by known suitable means.

The axial movement of the pair of flanges 14 is controlled by conventional means such as the axial drive means 20, an actuator means 40 and a brake 42. The axial drive means 20 includes a drive shaft 35 which has threads 36 and 37 of opposite hand which are connected to respective collars 16, each collar containing a complementary thread to the threads 36 or 37. Each outer end 38 of the drive shaft 35 is rotatably supported by a support plate 39 which is fixed to sleeve 12.

The drive shaft 35 is rotated by the actuator means 40 which includes planetary gears 45 keyed or attached by other suitable means to one outer end 38 of the drive shaft 35. A sun gear 50 engages the planet gears 45 and is formed on a sleeve 51 that is rotatably mounted on the sleeve 12.

The brake 42 includes the sleeve 51 which is formed at its inner end with a brake hub 52 which is surrounded by an expander tube type brake 53 mounted on a frame support 54. The other outer end 38 of the drive shaft 35 carries a lock collar 55 slidable on and keyed to the end of the drive shaft 35. A pin 56 projects from the lock collar 55. Mating holes 57 are drilled in the adjacent fixed end plate 39 so that when the lock collar 55 is shifted axially to the right and clamped into place by a set screw, the drive shaft 35 cannot turn.

The operation of the axial drive means 20 will now be explained in the references made to FIG. 1. With lock collar 55 shifted to the left and with brake 53 applied to the brake hub 52, the latter is stationary. Rotation of the shaft 11, sleeve 12 and each flange 14 carries the screws 35 and the planetary gears 45 around the sun gear 50 which is fixed by the brake 53. This rotation will either separate or bring the respective flanges 14 toward the transverse plane P depending upon the direction of rotation given to the drum shaft 11. When the flanges 14 have reached their desired position, the brake 53 is released and the lock collar 55 is applied to maintain that position.

When the brake 53 is released, sleeve 51 is free to rotate about the shaft 11 and locking collar 55 can be shifted to the right to lock the screws in place. Other means may be provided to move the respective flanges 14 toward and away from each other as only a single means is shown.

Figure 3:
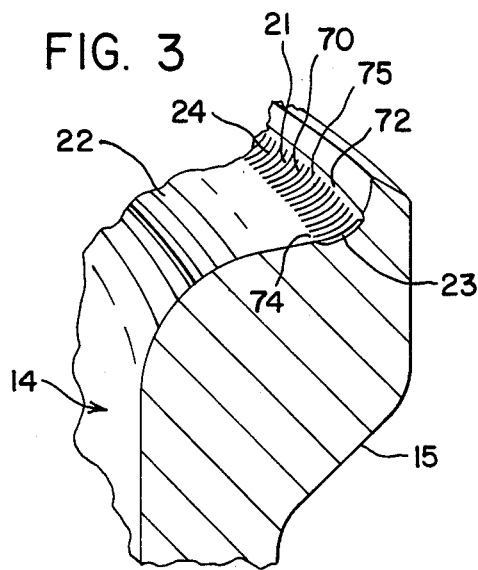
FIG. 3 is a partial perspective view of a flange of FIG. 2.
Figure 4:
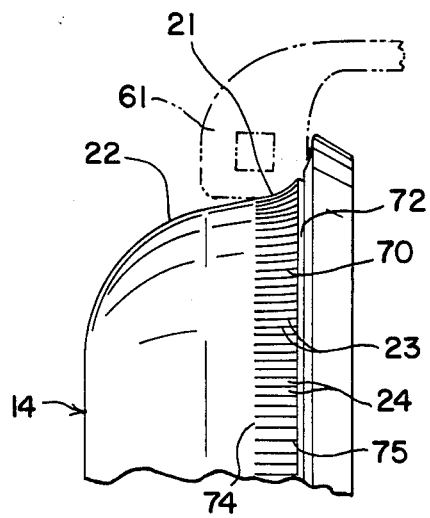
FIG. 4 is a partial side view of the flange of FIG. 2 showing a bead portion of a tire mounted thereon represented by phantom lines.

The radial outer end of each upper flange portion 15 includes a bead seat 21 and a mounting surface 22 which is curvilinearly contoured to allow the bead portion 61 of the first stage green tire 8 to slide into and/or slide out of the bead seat 21. As shown in FIGS. 3 and 4, in the present invention the mounting surface 22 has a radius of about one inch circumferentially around the upper flange portion 15.

The mounting surface 22 has a static coefficient of friction less than about 0.06 which can be achieved by coating the surface 22 with a fluoropolymer coating such as Impreglon ® coating or a Teflon ® coating or can be achieved by other conventional methods. The combination of the contour and the described static coefficient of friction of the surface 22 allows the bead portion of the first stage green tire 8 to slide into and out of the bead seat 21 with limited resistance and without the application of a lubricant.

As shown in FIG. 4, each bead seat 21 comprises a suitable radius of curvature to receive the corresponding bead portion 61 wherein the radius of curvature of the bead seat 21 is in the range of about $\frac{1}{4}$ inch to about $\frac{3}{4}$ inch. For a 12 inch nominal size tire, the radius of the bead seat 21 is about $\frac{3}{8}$ inch whereas for a 16 inch tire the radius is about $\frac{1}{2}$ inch.

Figure 2:
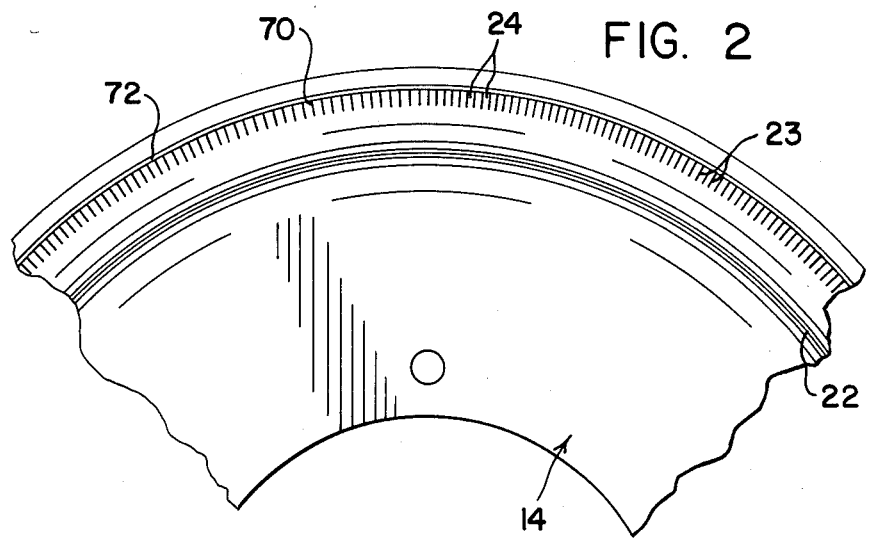
FIG. 2 is a partial frontal view of a flange used in the apparatus of FIG. 1.

The bead seat 21 further comprises a plurality of bead portion bearing surfaces 23 wherein each bearing surface 23 is separated by a groove 24 such that the bead portion does not contact the groove 24. The plurality of bead portion bearing surfaces 23 in the bead seat 21 can be accomplished by suitable means such as knurling 70 as shown in FIGS. 2, 3 and 4 wherein each bead seat 21 contains about 10 knurls per inch with a groove 24 between each knurl 70. It is believed that this reduced area in the bead seat 21 contacting the bead portion allows the bead portion to release more efficiently.

The process of knurling results in a displacement of excess material to the sides of the knurls wherein the excess material forms a "burr" which could be detrimental to a bead portion 61 if the burr is not removed. In the present invention, the excess material generated at a first end 74 of the knurl 70 is smoothed and at the second end 75 of the knurl 70 a "V" notch 72 is cut. The "V" notch 72 is cut about 0.070 inch (1.8 cm) deep and extends circumferentially continuously about each bead seat 21. The "V" notch facilitates release of the bead portion 61 from the bead seat 21.

In the operation described, a tire of a certain construction will be described and used as an example, it being understood, however, that the invention is not limited to a tire having all the details of this example.

Building a tire on apparatus 7 begins by placing a first stage green tire 8 over the flanges 14. The first stage green tire 8 usually comprises a carcass made up of one or more plies of reinforced material wherein the carcass may be reinforced by any one of the known fabric reinforcement materials or may be fiberglass or metal.

The first stage green tire 8 further comprises two bead portions 61, one at each end of the first stage green tire 8 wherein each bead portion is covered with a finishing strip. A pair of sidewalls are placed around the carcass of the green tire 8.

The first stage green tire 8 is placed over the flanges 14 which are in an axial semi-retracted position. The apparatus is then operated to separate the flanges 14 until each bead portion 61 slides over each mounting surface 22 so as to allow each bead portion to fit into the respective bead seat 21. The drive screw 35 is rotated sufficiently to maintain the respective bead portions 61 in tension while simultaneously therewith sufficient air pressure is introduced into the chamber 17 defined by the first stage tire carcass 8 in the flanges 14 to distend the tire carcass into cylindrical toroidal shape. As the air pressure is increased, the drive screw 35 is rotated relative to shaft 10 such that the respective flanges 14 along with the bead portions 61 of the first stage green tire 8 are moved toward each other the precise same distance to control the toroidal shaping of tire carcass 8 to the form.

At this stage, belts and tread rubber are placed on the tire carcass to circumferentially encompass such carcass with the respective ends applied to each other as conventionally done. Thereafter the green tire is stitched by applying forces against the tire to seal the belts and tread rubber. The pressure in the chamber is sufficiently increased above the existing pressure in the chamber to counteract the forces applied against the tire by the stitching process.

When the green tire is ready for removal from the tire building apparatus 7, the flanges 14 are moved axially toward each other to allow the release of the bead portions 61 from the bead seat 21 of each flange 14 therein allowing the air to be released from the chamber. The release of the air from chamber allows the tire to relax and at this time the completed green tire can be removed from the tire building apparatus 7.

While there has been shown and described a preferred embodiment of the present invention, it will be understood by those skilled in the art that various rearrangements and modifications can be made therein without departing from the scope of the invention which is to be measured by the accompanying claims.

I claim:

1. A rotatable tire building apparatus to support tire components placed therearound, said apparatus having a central horizontal axis; a transverse center plane of symmetry normal to the central horizontal axis; a flange support assembly; a pair of axially spaced flanges mounted on the flange support assembly; drive means connected to said flanges to axially move said flanges relative to said transverse center plane; each of said flanges having a tire bead mounting surface and a tire bead seat at a radially outer end portion, the improvement wherein A. said tire bead mounting surface
 1. is disposed axially outwardly from said tire bead seat relative to said transverse center plane;
 2. is curvilinearly contoured to allow a tire bead portion to slide into and out of the tire bead seat;
 3. is made of material having a static coefficient of friction less than about 0.06; and B. said tire bead seat
 1. is disposed axially inwardly from said tire bead mounting surface relative to said transverse center plane;
 2. has a radius of curvature of between about ¼ inch to about ¾ inch; and
 3. has a plurality of circumferentially spaced bead portion bearing surfaces separated by radially extending grooves.

2. The apparatus of claim 1 wherein said mounting surface is made of fluoropolymer material.

3. The apparatus of claim 1 wherein said plurality of circumferentially spaced bearing surfaces are knurls.

4. The apparatus of claim 3 wherein said bead seat further comprises a continuous circumferential "V" shaped notch to facilitate release of a tire bead portion from the bead seat.

* * * * *